July 7, 1925.
1,544,864
C. D. RULE
AUTO SERVICE INDICATOR
Filed Oct. 27, 1923
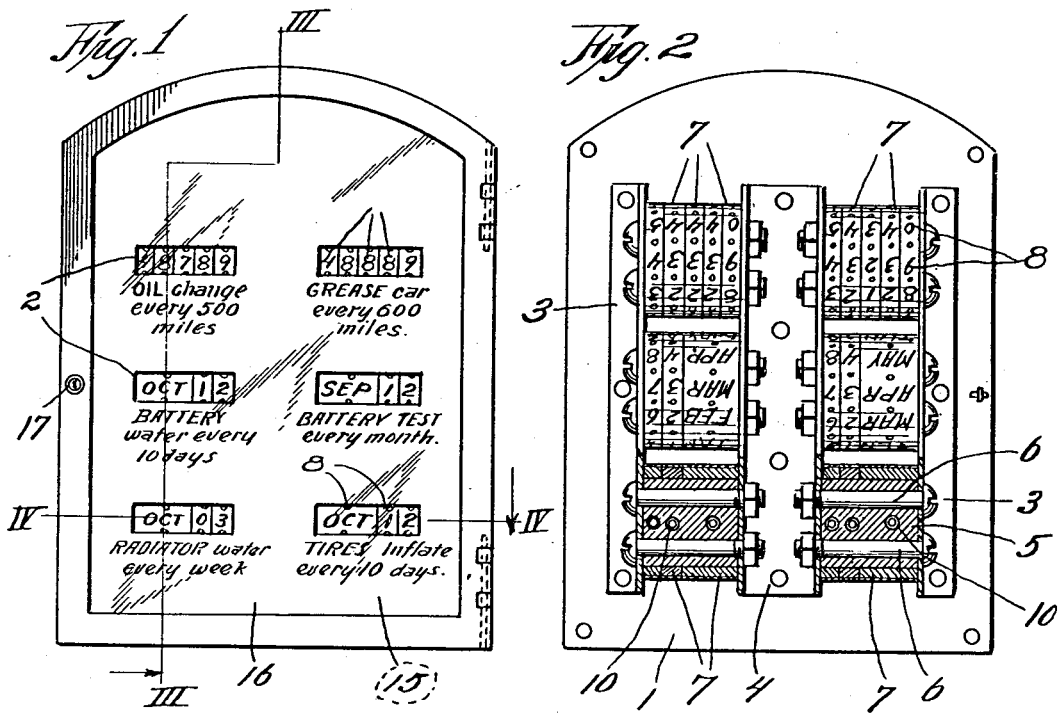
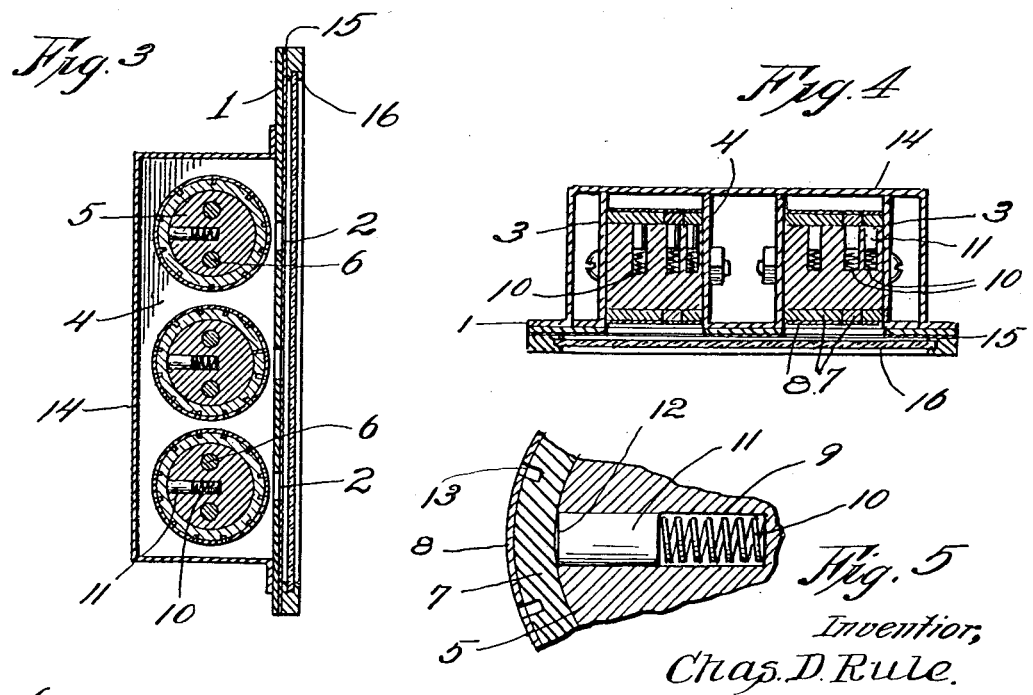
Witness:
R. E. Hamilton
Inventor,
Chas. D. Rule.
By Thorp & Ginard
Attys Patented July 7, 1925.

1,544,864

UNITED STATES PATENT OFFICE.

CHARLES D. RULE, OF KANSAS CITY, MISSOURI.

AUTO SERVICE INDICATOR.

Application filed October 27, 1923. Serial No. 671,102.

*To all whom it may concern:*

Be it known that I, CHARLES D. RULE, a citizen of the United States, and resident of Kansas City, Jackson County, Missouri, have invented a certain new and useful Improvement in Auto Service Indicators, of which the following is a complete specification.

This invention relates to service indicators for use in indicating to the owner or other persons interested, the exact time when an automobile should be greased, the oil changed, the battery attended to, fresh water placed in the radiator, and the tires inflated, and, of course, may be employed to indicate other conditions if found desirable.

The device embodying the invention is primarily intended to form a part of the instrument board of the motor car and to be readily accessible for inspection and setting of the mechanism according to the service requirements of the car.

Under the present practice taxi cab and other companies employing a fleet of cars, keep a more or less accurate account of the service mentioned by means of charts maintained in the garage, but as far as the private owner is concerned nothing has been provided by the automobile companies whereby he may easily and readily keep an accurate record of the absolutely essential upkeep of his car. Even if the owner does not attend to the oiling and greasing, it is impossible for the garage or service station attending to these details to know just when any of them have been performed, as the owner usually forgets or is careless in his attempt to maintain a record.

The prime object of the invention, therefore, is to maintain readily accessible and convenient, a means which the owner or other person may, as soon as any of the necessary service duties have been performed, set to indicate the next time the same duty must be carried out. For instance, it is desirable to change the oil in the crank case of a car every five hundred miles. With the device of the invention, the operator will progressively advance certain indicating cylinders by steps of five hundred miles, according to the reading of the speedometer, immediately after each change of oil. When the speedometer indicates that the car has travelled five hundred miles, the car will be oiled and the cylinder reset to accord with the speedometer reading at this time, and so on indefinitely, the result being that the cylinder will always indicate the mileage at the time of last oiling. Again, say the battery should be tested every month. Immediately after each battery test, the operator will advance the corresponding cylinder to indicate the date of such test. This cylinder will thus always indicate the date of the last battery test. It is therefore, necessary to provide a cylinder for each service duty as will be readily understood.

With the object named in view, the invention consists in certain novel and useful features of construction and organization of parts as hereinafter described and claimed; and in order that it may be fully understood, reference is to be had to the accompanying drawing, in which:—

Figure 1 is a face view of a service indicator embodying the invention as it will appear when assembled for use on an instrument board of a motor car.

Figure 2 is a rear view of the same with a dust housing or casing removed from position.

Figure 3 is a section on the line III—III of Figure 1 with the housing or casing in position.

Figure 4 is a section on the line IV—IV of Figure 1 with the housing or casing in position.

Figure 5 is an enlarged detailed sectional view to illustrate a part of the invention not otherwise sufficiently shown.

In the said drawing, where like reference characters identify corresponding parts in all of the figures, 1 indicates a suitable metallic or other face plate, provided as illustrated, with six similar rectangular openings 2 for the exhibition of certain registering cylinders hereinafter referred to.

Riveted or otherwise rigidly secured to the rear side of the face plate and adjacent the opposite edges of the same are a pair of vertically extending L-shaped brackets 3, each of said brackets being provided with alined perforations in groups of two. Secured to the face plate and centrally between the brackets 3, is a U-shaped bracket 4, formed in its opposite legs with groups of perforations registering respectively with the groups in the adjacent side brackets 3.

Rigidly secured between each of the side brackets 3 and the adjacent leg of the bracket 4, are barrels 5, each being maintained in fixed position by means of bolt and nut supports 6, the bolts passing through the registering perforations of the brackets, and loosely journaled on said barrels are a plurality of rotatable rings 7, each of said rings being provided peripherally with suitable numbers or letter-carrying rings 8.

It is to be understood that the openings 2 in the face plate are so spaced that each opening will exhibit a row of the data appearing on its respective rings, and that in order to maintain the proper data in fixed position with regard to the openings, each barrel 5, in alinement with each of its rings is formed with a bore or opening 9 within which an expansion spring 10 is snugly received. Forced down upon the spring and projected thereby is a resistance foot or detent 11, which is formed with a flat face 12, thus providing a pair of sharp corners for impingement against the under face of its respective ring. The pressure of the spring will provide sufficient friction to guard against the accidental rotation of the ring. In order to provide means whereby the cylinders may be set from time to time, as found desirable, a perforation 13 through the cylinder and into the cylinder 7 is provided between each of the numbers or letters of the column of indicating data appearing on each ring. The operator will insert the point of a pencil or other instrument into an opening 13 through the opening 2 of the face plate and will then manually revolve the cylinder until further movement is stopped through abutment of the pencil with the opposite wall of said opening 2, the spring actuated friction foot 11 locking the cylinder against accidental rotation.

The cylinder and supporting brackets are enclosed in a suitable dust and dirt proof casing 14 secured in any suitable manner to the rear side of the face plate 2. Secured to the front side of the face plate is a celluloid or other plate 15 which is formed with rectangular openings registering with the openings 2 of the face plate, and below each of said openings is printed indicating phrases, such as "Oil change every 500 miles", "Grease car every 600 miles", "Battery water every 10 days", "Radiator water every week", and "Tires inflate every 10 days". The cylinders for the first two services mentioned are so assembled and arranged as to indicate miles from zero to ninety nine thousand nine hundred and ninety nine, while the cylinders for all of the other services mentioned are arranged to indicate the months and days of the month.

The face of the indicator is equipped with a glass closure member 16 hinged along one of its side edges to the face plate and provided at its opposite edge with a suitable lock 17 to prevent unauthorized tampering with the cylinders of the indicator and thus defeating the purpose for which it is provided.

It will be evident from the above that each cylinder will be set ahead according to the directions appearing on the plate 15 after each service operation, and that such cylinders will always indicate to the driver when such service operation should again be carried out, thus providing a positive check for the information of the person customarily servicing the car.

From the above description, it will be apparent that I have produced a device of the character set forth which possesses all the features of advantage set forth as desirable, and while I have described and claimed the preferred embodiment of the same, it is to be understood that I reserve the right to make all changes properly falling within the spirit and scope of the appended claims.

I claim:

A service indicator comprising a face plate adapted to be secured to a motor car and provided with an opening, rearwardly projecting brackets secured to the back of said face plate, a solid barrel member bridging the space between said braces, a pair of bolts securing said barrel in position between the brackets and against rotation, and a series of indicating cylinders rotatably encircling said barrel and having indicia adapted to register with the opening in said plate.

In witness whereof I hereunto affix my signature.

CHARLES D. RULE.